(12) United States Patent
Reyenga et al.

(10) Patent No.: US 8,544,262 B2
(45) Date of Patent: Oct. 1, 2013

(54) FLOW-CONTROL ASSEMBLY WITH A ROTATING FLUID EXPANDER

(75) Inventors: James Reyenga, Long Beach, CA (US); William Joseph Smith, Gardena, CA (US)

(73) Assignee: Honeywell International, Inc., Morristown, NJ (US)

( * ) Notice: Subject to any disclaimer, the term of this patent is extended or adjusted under 35 U.S.C. 154(b) by 814 days.

(21) Appl. No.: 12/772,516

(22) Filed: May 3, 2010

(65) Prior Publication Data

US 2011/0265882 A1 Nov. 3, 2011

(51) Int. Cl.
*F16D 31/02* (2006.01)

(52) U.S. Cl.
USPC .......................................................... 60/397

(58) Field of Classification Search
USPC ............................... 60/396, 397; 123/339.23
See application file for complete search history.

(56) References Cited

U.S. PATENT DOCUMENTS

| | | | |
|---|---|---|---|
| 3,356,289 A | 12/1967 | Plotkowiak | |
| 3,756,739 A | 9/1973 | Boussuges | |
| 4,177,005 A | 12/1979 | Bozung et al. | |
| 4,439,983 A | 4/1984 | Gertz | |
| 5,544,484 A | 8/1996 | Voss et al. | |
| 5,559,379 A | 9/1996 | Voss | |
| 5,818,117 A | 10/1998 | Voss et al. | |
| 6,050,775 A | 4/2000 | Erdmann et al. | |
| 6,094,909 A | 8/2000 | Weber et al. | |
| 6,276,139 B1 | 8/2001 | Moraal et al. | |
| 6,584,963 B2 | 7/2003 | Arnold | |
| 6,817,173 B2 * | 11/2004 | Paffrath et al. | 60/397 |
| 7,152,393 B2 | 12/2006 | Hergemoller et al. | |
| 2003/0140630 A1 | 7/2003 | Baeuerle et al. | |
| 2003/0167751 A1 | 9/2003 | Paffrath et al. | |
| 2007/0007771 A1 | 1/2007 | Biddle et al. | |
| 2007/0062192 A1 | 3/2007 | Weber et al. | |
| 2007/0107429 A1 | 5/2007 | Squires | |

(Continued)

FOREIGN PATENT DOCUMENTS

DE 32 05 722 8/1983
DE 32 05 722 A1 8/1983

(Continued)

OTHER PUBLICATIONS

International Search Report for Application No. PCT/US2011/034018 dated Dec. 13, 2011.

(Continued)

*Primary Examiner* — Michael Leslie
(74) *Attorney, Agent, or Firm* — Alston & Bird LLP (57) ABSTRACT

A flow-control assembly may include a fluid conduit and a flow-control valve in the fluid conduit. The flow-control assembly may further include a fluid expansion conduit with an inlet defined at least in part by the fluid conduit and configured to selectively receive flow of a fluid from the fluid conduit. The fluid expansion conduit may further include an outlet in fluid communication with the fluid conduit downstream of the flow-control valve. A rotating fluid expander in the fluid expansion conduit may be configured to expand the fluid and thereby rotate and in some embodiments generate electricity. In a first position flow is substantially blocked. In a second position flow is allowed through the fluid expansion conduit. In a third position flow through the fluid conduit is allowed without necessarily passing through the fluid expansion conduit. Related systems and methods are also provided.

19 Claims, 9 Drawing Sheets

(56) References Cited

U.S. PATENT DOCUMENTS

| | | |
|---|---|---|
| 2008/0095610 A1 | 4/2008 | Bosen |
| 2009/0060719 A1 | 3/2009 | Haugen |
| 2011/0241344 A1 | 10/2011 | Smith et al. |
| 2011/0271936 A1 | 11/2011 | Reyenga et al. |

FOREIGN PATENT DOCUMENTS

| | | | |
|---|---|---|---|
| EP | 0 147 740 A2 | | 12/1984 |
| EP | 0 344 902 A2 | | 12/1989 |
| EP | 0 360 569 A2 | | 3/1990 |
| EP | 1 158 141 A2 | | 11/2001 |
| EP | 0 770 189 | | 2/2002 |
| EP | 0 770 189 B1 | | 2/2002 |
| JP | 51-143122 | | 12/1976 |
| JP | 51-143122 A | | 12/1976 |
| JP | 60-182316 A | | 9/1985 |
| JP | 04-241704 A | | 8/1992 |
| JP | 2008-157150 A | | 7/2008 |
| KR | 20060055430 A | | 5/2006 |
| WO | WO 92/09800 A1 | | 6/1992 |
| WO | WO 96/04487 A1 | | 2/1996 |
| WO | WO 2009/092670 A1 | | 7/2009 |
| WO | WO 2010/043910 A1 | | 4/2010 |

OTHER PUBLICATIONS

International Search Report and Written Opinion for International Application No. PCT/US2011/028015, mailed Sep. 20, 2011.

International Preliminary Report on Patentability and Written Opinion from International Application No. PCT/US2010/040144, issued Jan. 4, 2012.

International Search Report and Written Opinion for International Application No. PCT/US2011/034059, mailed Jan. 5, 2012.

Extended Search Report for European Application No. 08150565.3, mailed Jul. 7, 2008.

Eichhorn, R.H.L., et al.; Waste Energy Driven Air Conditioning System (WEDACS); SAE International Technical Papers; Paper No. 2009-24-0063; Published Sep. 13, 2009; DOI: 10.4271/2009-24-0063.

Guzzella, et al.; Swiss Federal Institute of Technology; Recuperative Throttling of SI Engines for Improved Fuel Economy; 2001-01-0514; 2004 SAE International (6 pgs.).

Muller, et al.; DaimlerChrysler AG, Research Body and Powertrain and University of Karlsruhe, Institute for Thermal Turbomachinery; Using the Centrifugal Compressor as a Cold Air Turbine; 2006 DaimlerChrysler AG; pp. 1-13.

Onder, et al.; Measurement and Control Laboratory, Swiss Federal Institute of Technology; Modelling and Control of an Active Throttle for SI Engines; IFAC Advances in Automotive Control; Salerno, Italy,.2004; pp. 155-160.

Tomic, et al.; University of Belgrade, Faculty of Mechanical Engineering; Spark Ignition Engine Part Load Fuel Economy Improvement: Numerical Consideration; FME Transactions (2003); pp. 21-26 ; vol. 31, No. 1.

Eichhorn et al., "Throttle Loss Recovery Using a Variable Geometry Turbine," *SAE International*, published May 5, 2010, 19 pages.

Guzzella et al., "Recuperative Throttling of SI Engines for Improved Fuel Economy," *SAE International*, 2004, 6 pages.

Muller et al., "Using the Centrifugal Compressor as a Cold Air Turbine," DaimlerChrysler AG, 2006, pp. 1-13.

Onder et al., "Modelling and Control of an Active Throttle for SI Engines," *IFAC Advances in Automotive Control*, 2004, pp. 155-159.

Tomic et al., "Spark Ignition Engine Part Load Fuel Economy Improvement Numerical Consideration," *FME Transactions*, vol. 31, 2003, pp. 21-26.

\* cited by examiner

FLOW-CONTROL ASSEMBLY WITH A ROTATING FLUID EXPANDER

BACKGROUND OF THE INVENTION

1. Field of the Invention

The present application relates to flow-control assemblies comprising rotating fluid expanders and associated systems and methods.

2. Description of Related Art

The throttling of intake air is a known way of controlling the output of internal combustion engines. Specifically, throttling of intake air is used in spark ignition engines, although some diesel engines may also employ throttling of intake air. Known embodiments of internal combustion engines use throttle bodies to throttle the intake air to the desired flow rate. However, the throttling of air may cause a loss in efficiency during partial throttle conditions. Specifically, throttle bodies in some embodiments use butterfly valves to throttle the flow of intake air. While butterfly valves are known for their simplicity and reliability, they provide the throttling function by constricting the air intake path to a smaller area, which creates flow losses.

Thus, prior art solutions have been developed which seek to control the flow of intake air while recovering some of the energy lost in the throttling process. However, the prior art solutions have suffered from issues in packaging the solution in such a way that they conveniently function within existing automotive constraints. Further, the existing solutions tend to add complexity and costs which reduce their commercial viability.

Accordingly, it may be desirable that an improved flow-control assembly be provided which operates without significant additional complexity and which may operate in the confines of automobile engines.

BRIEF SUMMARY OF THE INVENTION

The present disclosure in one aspect describes a flow-control assembly comprising a fluid conduit configured to receive flow of a fluid, a flow-control valve in the fluid conduit, and a fluid expansion conduit. The fluid expansion conduit comprises an inlet defined at least in part by the fluid conduit and configured to selectively receive flow of the fluid from the fluid conduit, and an outlet in fluid communication with the fluid conduit downstream of the flow-control valve. The flow-control assembly further comprises a rotating fluid expander in the fluid expansion conduit configured to expand the fluid and thereby rotate. The flow-control valve is configurable to a first position wherein the flow-control valve substantially blocks flow of the fluid through the fluid conduit and the fluid expansion conduit.

In some embodiments the rotating fluid expander comprises a turbine, and alternatively or additionally the rotating fluid expander may be coupled to an electrical generator which in some embodiments may be retained within an integral housing. Alternatively or additionally the fluid conduit and the fluid expansion conduit may be defined by the integral housing. Further, the fluid expansion conduit may comprise a volute which substantially surrounds the rotating fluid expander. The flow-control valve may comprise a butterfly valve in some embodiments. Also, the flow-control assembly may further comprise a valve position sensor configured to detect the position of the flow-control valve, and a valve adjustment mechanism configured to control the flow-control valve.

Further, in some embodiments the flow-control valve may be configurable to a second position wherein the flow-control valve substantially blocks flow of the fluid through the fluid conduit and at least partially unblocks the fluid expansion conduit to thereby allow flow of the fluid through the fluid expansion conduit. Additionally, the flow-control valve may be configurable to a third position wherein the flow-control valve at least partially unblocks the fluid conduit to thereby allow flow of the fluid through the fluid conduit without necessarily passing through the fluid expansion conduit.

Embodiments additionally include a system for controlling flow of a fluid comprising a flow-control assembly. The flow-control assembly may comprise a fluid conduit configured to receive flow of a fluid, a flow-control valve in the fluid conduit, and a fluid expansion conduit. The fluid expansion conduit may comprise an inlet defined at least in part by the fluid conduit and configured to selectively receive flow of the fluid from the fluid conduit, and an outlet in fluid communication with the fluid conduit downstream of the flow-control valve. A rotating fluid expander in the fluid expansion conduit may be configured to expand the fluid and thereby rotate. The flow-control valve may be configurable to a first position wherein the flow-control valve substantially blocks flow of the fluid through the fluid conduit and the fluid expansion conduit. The system may further include an internal combustion engine comprising one or more cylinders, wherein the flow-control assembly is configured to direct flow of the fluid to one or more of the cylinders of the internal combustion engine.

In some embodiments the flow-control assembly may further comprise an intake manifold configured to receive flow of the fluid from the flow-control assembly and distribute flow of the fluid to two or more of the cylinders. Additionally, in some embodiments the flow-control valve is the only valve for controlling flow of the fluid into the intake manifold. Also, the system may further comprise an exhaust manifold configured to receive flow of the fluid from one or more of the cylinders of the internal combustion engine.

Embodiments of the invention further include a method of controlling the flow of a fluid to an internal combustion engine. The method may comprise selectively configuring a flow-control valve between a first position wherein the flow-control valve substantially blocks flow of the fluid through a fluid conduit and a fluid expansion conduct, and a second position wherein the flow-control valve substantially blocks flow of the fluid through the fluid conduit and at least partially unblocks the fluid expansion conduit to thereby allow flow of the fluid through the fluid expansion conduit. The method may further include expanding the fluid in the fluid expansion conduit when flow of the fluid is directed thereto to thereby rotate a rotating fluid expander, and supplying the expanded fluid to the internal combustion engine.

In some embodiments the method further comprises generating electricity by coupling the rotating fluid expander to an electrical generator. The method may also include directing the fluid through the fluid expansion conduit back into the fluid conduit downstream of the flow-control valve. Additionally the method may further comprise selectively configuring the flow-control valve to a third position wherein the flow-control valve at least partially unblocks the fluid conduit to thereby allow flow of the fluid through the fluid conduit without necessarily passing through the fluid expansion conduit, and supplying fluid from the fluid conduit to the internal combustion engine.

BRIEF DESCRIPTION OF THE SEVERAL VIEWS OF THE DRAWING(S)

Having thus described the embodiments in general terms, reference will now be made to the accompanying drawings, which are not necessarily drawn to scale, and wherein:

DETAILED DESCRIPTION OF THE DRAWINGS

Apparatuses and methods for controlling flow of a fluid now will be described more fully hereinafter with reference to the accompanying drawings in which some but not all embodiments are shown. Indeed, the present development may be embodied in many different forms and should not be construed as limited to the embodiments set forth herein; rather, these embodiments are provided so that this disclosure will satisfy applicable legal requirements. Like numbers refer to like elements throughout.

Figure 1:
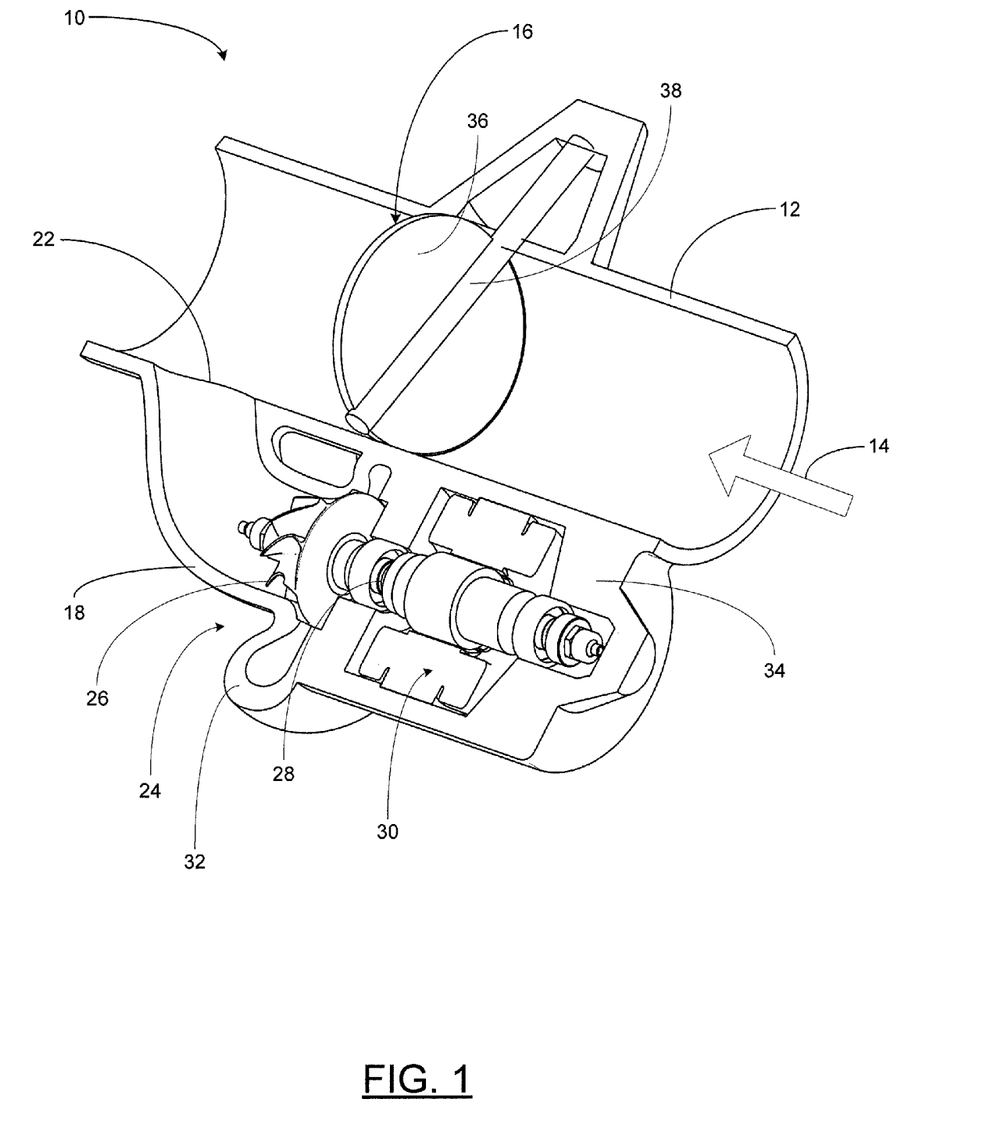
FIG. 1 illustrates a cross-sectional view of an embodiment of a flow-control assembly in a first position wherein a flow-control valve substantially blocks flow of a fluid through a fluid conduit and a fluid expansion conduit.

Referring to FIG. 1, a cross-sectional view through an embodiment of a flow-control assembly 10 is illustrated. The flow control assembly 10 may comprise a fluid conduit 12 which is configured to receive flow 14 of a fluid. In an example embodiment, the fluid may comprise air which is supplied to an engine, as will be described below with respect to a system embodiment. A flow-control valve 16 is positioned in the fluid conduit 12. The flow-control assembly 10 further includes a fluid expansion conduit 18. The fluid expansion conduit 18 comprises an inlet 20 (see FIGS. 2-4) which may be defined at least in part by the fluid conduit 12 and configured to selectively receive flow 14 of the fluid from the fluid conduit. Further, an outlet 22 of the fluid expansion conduit 18 is in fluid communication with the fluid conduit 12 downstream of the flow-control valve 16. Downstream, as used herein, refers to placement which is generally past the referenced item in terms of the normal flow of the fluid during operation of the flow-control assembly 10. Conversely, upstream, as used herein, may refer to placement which is generally before the referenced item in terms of the normal flow of the fluid during operation of the flow-control assembly 10.

The flow-control assembly 10 further comprises a rotating fluid expander 24 in the fluid expansion conduit 18 which is configured to expand the fluid when it is supplied thereto and thereby rotate. Thus, it should be understood that the fluid expansion conduit 18 does not necessarily expand the fluid itself, but rather the fluid expansion conduit is named as such because it contains the rotating fluid expander 24, which expands the fluid. The rotating fluid expander 24 may comprise a turbine 26 mounted on a shaft 28 which allows the rotating fluid expander to rotate. The shaft 28, in turn, may be coupled to an electrical generator 30 which is configured to produce electrical energy when the rotating fluid expander 24 rotates. However, many alternative devices may be coupled to the rotating fluid expander 24. For instance, in other embodiments the shaft 28 may be coupled to a compressor in order to create a pressurized air flow, or the shaft may be coupled to a pulley which then drives an accessory item. Various other alternative devices may be coupled to the rotating fluid expander 24 as would be understood by one having ordinary skill in the art.

Further, the fluid expansion conduit 18 may comprise a volute 32 which substantially surrounds the rotating fluid expander 24 and supplies flow of the fluid thereto. Additionally, as illustrated, in some embodiments the fluid conduit 12 and the fluid expansion conduit 18 may be defined by an integral housing 34. Thus, in some embodiments the rotating fluid expander 24 and the electrical generator 30 may also be retained within the integral housing 34. Accordingly, the entire flow-control assembly 10 may comprise a relatively compact form.

Further, in some embodiments the fluid expansion conduit 18 may comprise alternative or additional features configured to provide the flow 14 of the fluid to the rotating fluid expander 24. In this regard, in some embodiments the flow-control assembly 10 may comprise vanes and/or a nozzle instead of, or in addition to the volute 32 described above. In some embodiments the vanes may comprise variable vanes and/or the nozzle may comprise a variable nozzle and thus the flow 14 of the fluid may be controlled by adjusting the variable vanes and/or the variable nozzle, thereby adjusting the flow of the fluid to the rotating fluid expander 24. In addition to controlling flow 14 of the fluid through the fluid expansion conduit 18, variable mechanisms may allow for more efficient extraction of power with the rotating fluid expander 24. Accordingly, the geometry of the rotating fluid expander 24 and the fluid expansion conduit 18 may differ in various embodiments.

The flow-control valve 16 is configurable between multiple positions. For instance, in some embodiments the flow-control valve 16 may comprise a butterfly valve such as when the flow-control valve comprises a throttle plate 36. Further, the flow-control valve 16 may comprise a valve adjustment mechanism such as an electric motor or throttle cable which is configured to control the flow-control valve by adjusting the position of the throttle plate 36. Specifically, the flow-control valve 16 may be controlled by rotating a shaft 38 to which the throttle plate 36 is coupled about its longitudinal axis. In some embodiments the flow-control assembly 10 may further comprise a valve position sensor which is configured to detect the position of the flow-control valve. For example, the throttle position sensor may be connected to the shaft 38 in some embodiments. Thus, the throttle position sensor may be used to provide feedback as to the position of the throttle plate 36 such that the position of the flow-control valve 16 may be adjusted to the desired position.

FIG. 1 illustrates the flow-control assembly 10 when the flow-control valve 16 is configured to a first position wherein the flow-control valve substantially blocks flow 14 of the fluid through the fluid conduit 12 and the fluid expansion conduit 18. As will be described below, in some embodiments the flow-control assembly 10 may be used to throttle a flow of air to an engine. Accordingly, the flow-control valve 16 may be configured in some embodiments to substantially block flow 14 of the fluid while allowing a small flow of the fluid through the flow-control assembly 10 in order to allow the engine to idle.

Figure 2:
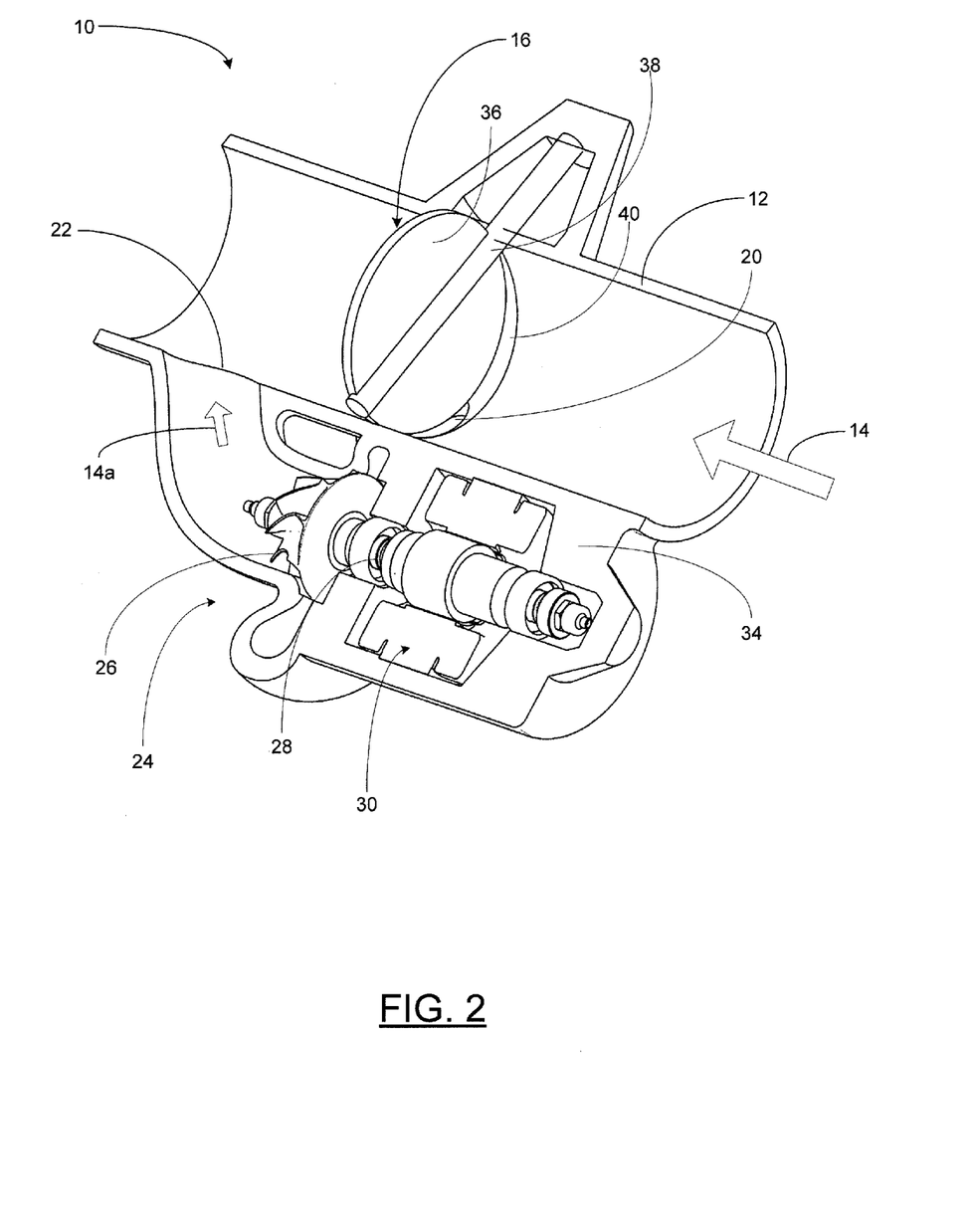
FIG. 2 illustrates a cross-sectional view of the embodiment of the flow-control assembly of FIG. 1 in a second position wherein a flow-control valve substantially blocks flow of a fluid through the fluid conduit and at least partially unblocks an inlet of the fluid expansion conduit to thereby allow a relatively small flow of the fluid through the fluid expansion conduit.
Figure 3:
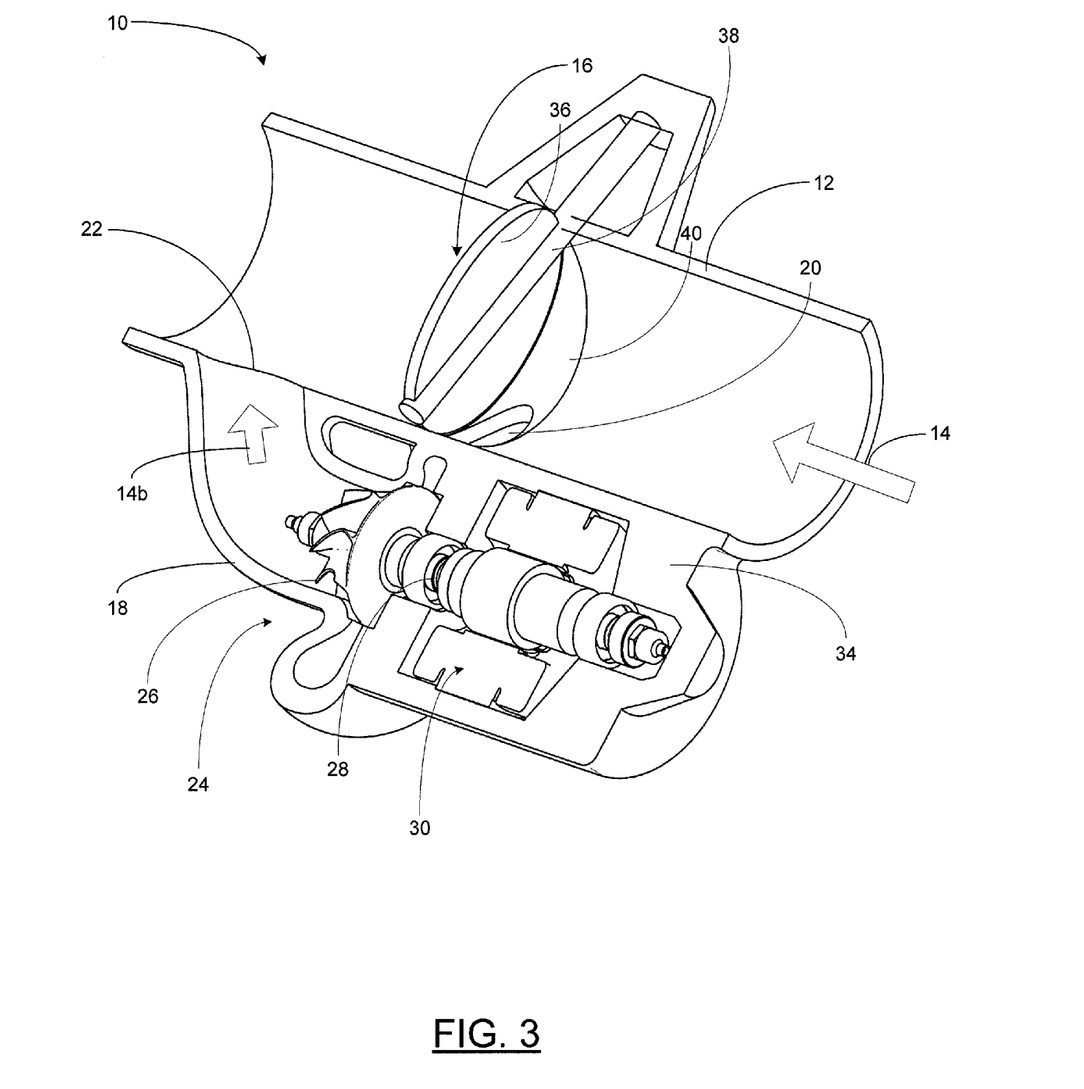
FIG. 3 illustrates a cross-sectional view of the embodiment of the flow-control assembly of FIG. 1 in the second position wherein the flow-control valve substantially blocks flow of a fluid through the fluid conduit and at least partially unblocks the inlet of the fluid expansion conduit to thereby allow a relatively larger flow of the fluid through the fluid expansion conduit.

FIGS. 2 and 3 illustrates the flow-control assembly 10 when the flow-control valve 16 is configured to a second position wherein the flow-control valve substantially blocks flow 14 of the fluid through the fluid conduit 12 and at least partially unblocks the inlet 20 of the fluid expansion conduit 18 to thereby allow flow 14a, 14b of the fluid through the fluid expansion conduit. In FIG. 2 the flow-control valve 16 has only slightly transitioned from the first position to the second position by rotating the throttle plate 36 clockwise about the shaft 38, and hence a relatively small flow 14a of the fluid is allowed through the fluid expansion conduit 18. However, as illustrated, the flow-control assembly 10 substantially blocks flow of the fluid past the flow-control valve 16 through the fluid conduit 12. In the embodiment illustrated herein, this is accomplished by creating a tight fit between the throttle plate 36 and the fluid conduit 12 in which the flow-control valve 16 is positioned. In particular, in the illustrated embodiment the fluid conduit 12 includes a sealing wall 40 which the throttle plate 36 substantially engages when the flow-control valve 16 is in the first position. In order to accommodate rotation of the throttle plate 36 about the shaft 38, the sealing wall 40 defines a curved profile of substantially the same radius as the throttle plate whereby the throttle plate thus maintains a tight fit with the sealing wall as it rotates to the second position.

However, as illustrated, the inlet 20 to the fluid expansion conduit 18 is also defined at least in part by the fluid conduit 12. Specifically, the inlet 20 comprises a hole in the sealing wall 40 at which the throttle plate 36 is out of contact with the fluid conduit 12 when the flow-control valve 16 is in the second position. Thus, the relatively small flow 14a of the fluid is allowed through the inlet 20 to the fluid expansion conduit 18. After traveling through the inlet 20, the fluid may enter the volute 32 which thereby feeds the fluid to the turbine 26 of the rotating fluid expander 24. Thus, the fluid is expanded by the turbine 26, causing the turbine to rotate the shaft 28 which enables the electrical generator 30 to thereby generate electrical current. As the flow of the fluid exits the turbine 26, it is directed to the outlet 22 of the fluid expansion conduit 18. As illustrated, in some embodiments the outlet 22 of the fluid expansion conduit connects to the fluid conduit 12 downstream of the flow-control valve 16 such that the outlet is in fluid communication with the fluid conduit downstream of the flow-control valve. Thus, the fluid expansion conduit 18 acts as a bypass around the flow-control valve 16 when the flow-control valve is in the second position.

Accordingly, as described above, the rotating fluid expander 24 may create electricity using the electrical generator 30 when the flow-control valve 16 is in the second position. Further, the flow-control valve 16 may be adjusted to allow for varying degrees of flow of the fluid through the flow-control assembly 10 when the flow-control valve is in the second position. For instance, whereas FIG. 2 illustrates the flow-control valve 16 when it has just entered the second position and accordingly only a relatively small portion of the inlet 20 of the fluid expansion conduit 18 is unblocked, FIG. 3 illustrates the flow-control valve 16 as it has opened further within the second position. Specifically, FIG. 3 illustrates the flow-control valve 16 with the throttle plate 36 rotated within the second position to a point at which the inlet 20 to the fluid expansion conduit 18 is substantially fully unblocked. Accordingly, flow of the fluid through the flow-control assembly 10 may be adjusted to the desired level by adjusting the flow-control valve 16 within the second position. Thus, for example, the arrangement of the flow-control valve 16 in FIG. 3 may allow for a relatively large flow 14b of the fluid through the fluid expansion conduit 18 as compared to the relatively small flow 14a of the fluid allowed by the configuration illustrated in FIG. 2. Further, the second position of the flow-control valve 16, as illustrated in FIGS. 2 and 3 directs substantially all of the flow 14 of the fluid through the fluid expansion conduit 18. Accordingly, the desired amount of flow of the fluid may be achieved while at the same time using the rotating fluid expander 24 to generate electricity by way of the electrical generator 30.

Figure 4:
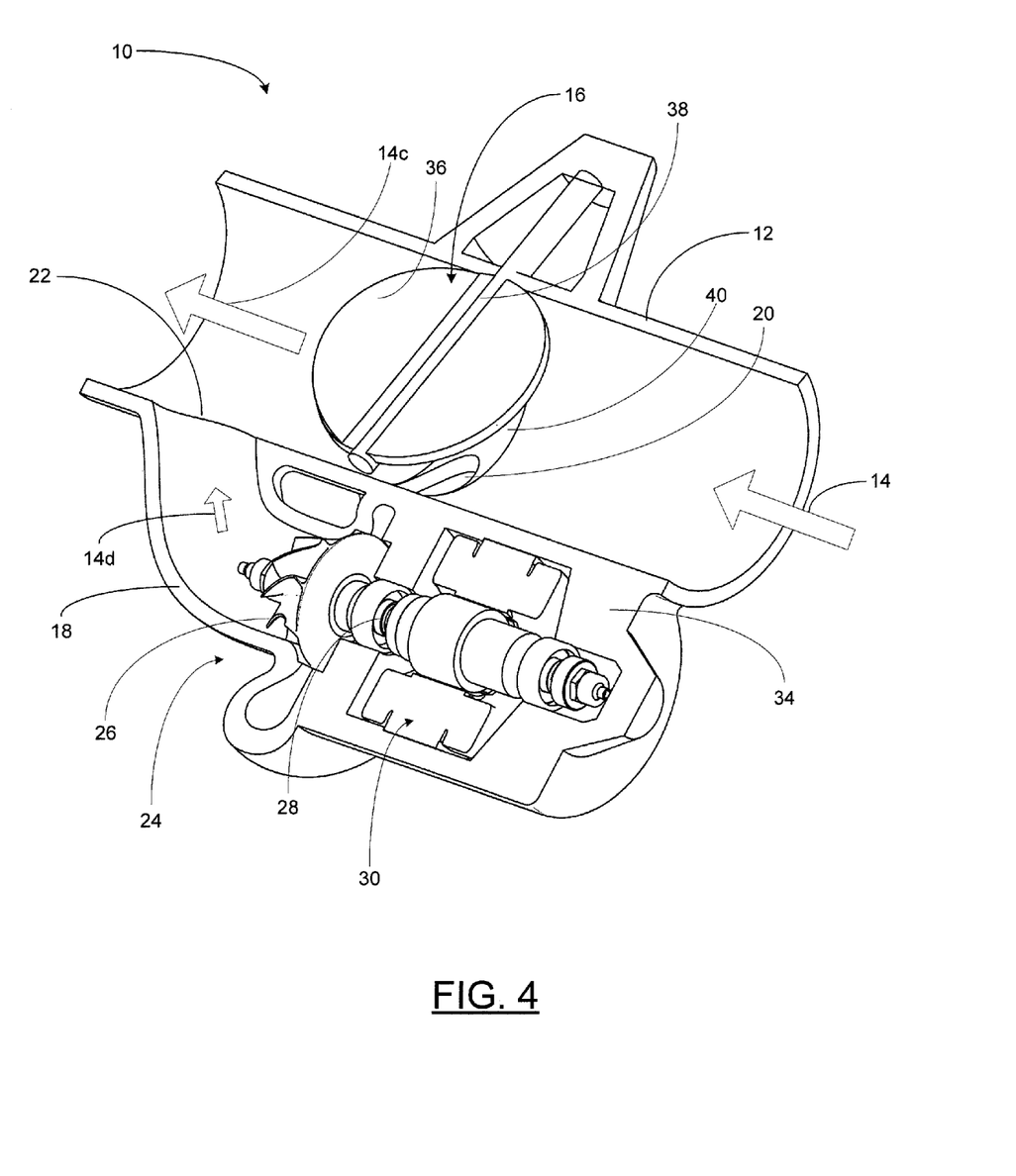
FIG. 4 illustrates a cross-sectional view of the embodiment of the flow-control assembly of FIG. 1 in a third position wherein the flow-control valve at least partially unblocks the fluid conduit to thereby allow flow of the fluid through the fluid conduit without necessary passing through the fluid expansion conduit.

However, in some instances additional flow of the fluid through the flow-control assembly 10 may be desirable. Accordingly, as illustrated in FIG. 4, the flow-control valve 16 may be configurable to a third position wherein the flow-control valve at least partially unblocks the fluid conduit 12 to thereby allow flow 14 of the fluid through the fluid conduit without necessarily passing through the fluid expansion conduit 18. In the third position the throttle plate 36 is rotated, clockwise as illustrated, past the inlet 20 to the fluid expansion conduit 18 and out of contact with the sealing wall 40. This allows a direct flow 14c of the fluid to pass through the flow-control valve 16 via the fluid conduit 12 without traveling through the fluid expansion conduit 18. However, in some embodiments a bypass flow 14d of the fluid may still travel through the fluid expansion conduit 18 in some instances due to the inlet 20 to the fluid expansion conduit remaining unblocked. Thus, by rotating the throttle plate 36 such that it is substantially parallel with the flow 14 of the fluid, the flow-control valve 16 may allow a maximum flow through the flow-control assembly 10 when the flow-control valve is in the third position.

Figure 5:
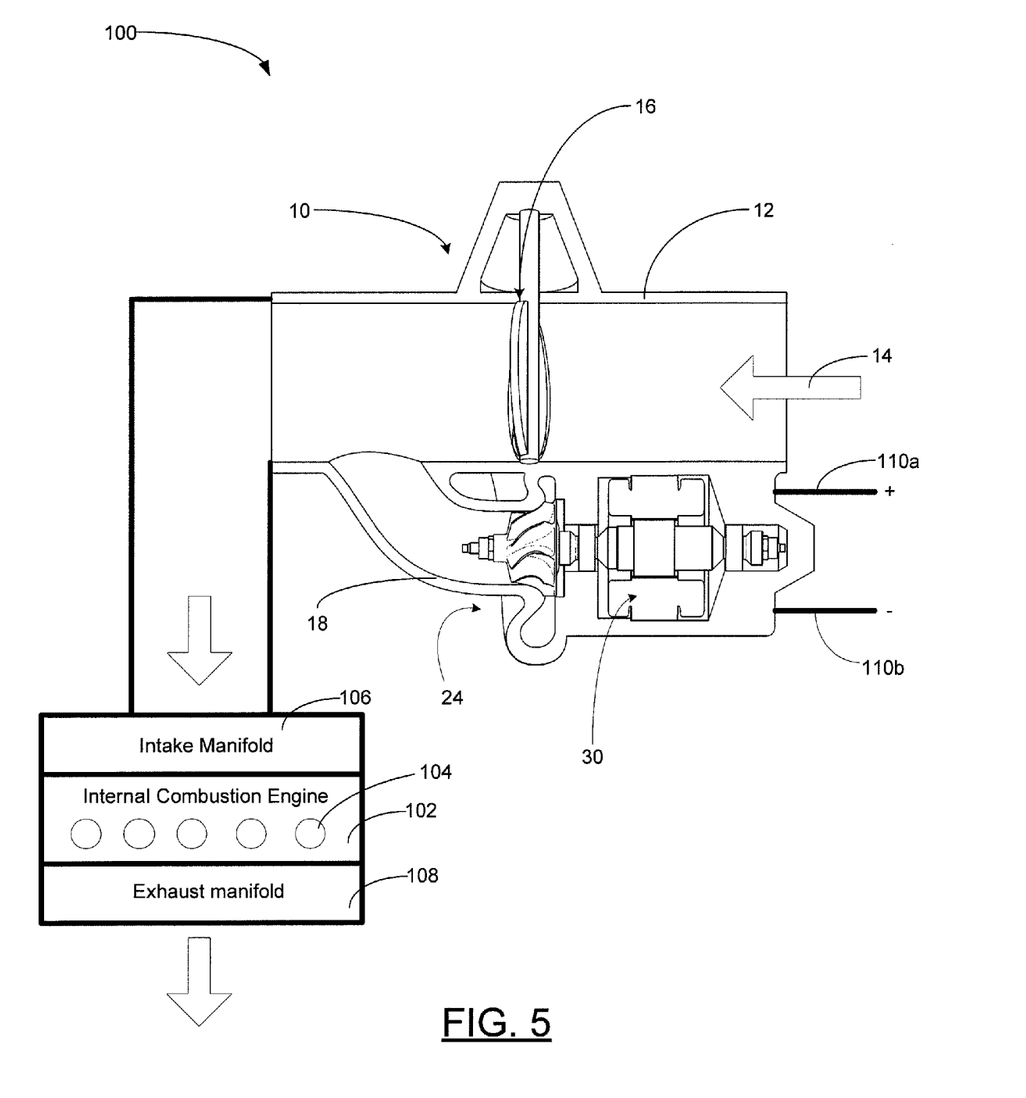
FIG. 5 illustrates a schematic view of a system for controlling flow of a fluid to an internal combustion engine comprising the flow-control assembly of FIG. 1

As schematically illustrated in FIG. 5, a system 100 for controlling flow of a fluid is also provided. The system 100 may comprise the flow-control assembly 10 including the fluid conduit 12 which is configured to receive flow 14 of a fluid, such as from an air intake which may include an air filter in some embodiments. Further, the flow-control valve 16 is in the fluid conduit. Additionally, the fluid expansion conduit 18 comprises the inlet 20 (see FIGS. 2-4), which is defined at least in part by the fluid conduit 12 and configured to selectively receive flow of the fluid from the fluid conduit. Further, the outlet 22 of the fluid expansion conduit 18 is in fluid communication with the fluid conduit 12 downstream of the flow-control valve 16. The flow-control assembly 10 also includes the rotating fluid expander 24 in the fluid expansion conduit 18, wherein the rotating fluid expander is configured to expand the fluid and thereby rotate. As described above, the flow-control valve 16 may be configurable between multiple positions including the first position, as illustrated, wherein the flow-control valve substantially blocks flow 14 of the fluid through the fluid conduit 12 and the fluid expansion conduit 18.

In addition to the flow-control assembly 10, the system 100 further comprises an internal combustion engine 102 comprising one or more cylinders 104. Thus, the flow-control assembly 10 may be configured to direct flow 14 of the fluid to one or more of the cylinders 104 of the internal combustion engine 102. The system 100 may additionally comprise an intake manifold 106 configured to receive flow of the fluid from the flow-control assembly 10 and distribute flow of the fluid to two or more of the cylinders 104 of the internal combustion engine 102. Further, the system 100 may include an exhaust manifold 108 configured to receive flow of the fluid from one or more of the cylinders 104 of the internal combustion engine 102, before exhausting the flow to the surroundings.

As illustrated, in some embodiments the flow-control valve 16 is the only valve for controlling flow of the fluid into the intake manifold 106. Accordingly, the load of the internal combustion engine 102 may be controlled in a substantially simple manner. Further, by using just one valve, the flow-control assembly 10 may occupy a relatively small amount of space which may be important when the system 100 is employed in an automotive context. However, in addition to controlling the amount of fluid supplied to the engine, which is air in this embodiment, the flow-control assembly 10 may be able to generate electricity when all or a portion of the flow 14 of the fluid is directed through the fluid expansion conduit 18. In particular, when an electric generator 30 is coupled to the rotating fluid expander 24, two leads 110a, 110b may be connected, for example, to a battery to thereby charge the battery. Thus, some of the energy that would otherwise be wasted in throttling the flow 14 of the fluid may be recovered during partial throttle situations such as when the flow-control valve 16 is in the second position. However, when full throttle is desired, the flow-control valve 16 may open to the third position and thereby allow a substantially unimpeded flow through the fluid conduit 12, to thereby reduce any loses associated with using a rotating fluid expander 24 in the flow-control assembly 10.

Further, a method of controlling the flow of a fluid to an internal combustion engine 102 is also provided. The method may comprise selectively configuring a flow-control valve 16 between a first position wherein the flow-control valve substantially blocks flow of the fluid through a fluid conduit 12 and a fluid expansion conduct 18, and a second position wherein the flow-control valve substantially blocks flow of the fluid through the fluid conduit and at least partially unblocks the fluid expansion conduit to thereby allow flow of the fluid through the fluid expansion conduit. The method further comprises expanding the fluid in the fluid expansion conduit 18 when flow of the fluid is directed thereto to thereby rotate a rotating fluid expander 24, and supplying the expanded fluid to the internal combustion engine 102. In some embodiments the method may further comprise generating electricity by coupling the rotating fluid expander 24 to an electrical generator 30. Additionally, the method may include directing flow of the fluid through the fluid expansion conduit 18 back into the fluid conduit 12 downstream of the flow-control valve 16. The method may further comprise selectively configuring the flow-control valve 16 to a third position wherein the flow-control valve at least partially unblocks the fluid conduit 12 to thereby allow flow of the fluid through the fluid conduit without necessarily passing through the fluid expansion conduit 18, and supply fluid from the fluid conduit to the internal combustion engine 102. Accordingly, embodiments of methods for controlling the flow of a fluid to an internal combustion engine are also provided.

Although embodiments of the flow-control assembly have generally been described and shown as employing the flow-control valve to block and unblock the inlet of the fluid expansion conduit, in alternate embodiments the flow-control valve may block and unblock the outlet of the fluid expansion conduit. In this regard, embodiments wherein the flow-control valve selectively opens and closes the outlet of the fluid expansion conduit in varying degrees may function in substantially the same manner as embodiments in which the inlet of the fluid expansion conduit is selectively opened and closed by the flow-control valve. In particular, controlling opening and closing of an end of the fluid expansion conduit in the manner described above may provide substantially the same functionality, regardless of whether control of the inlet or the outlet of the fluid expansion conduit is employed.

Figure 6:
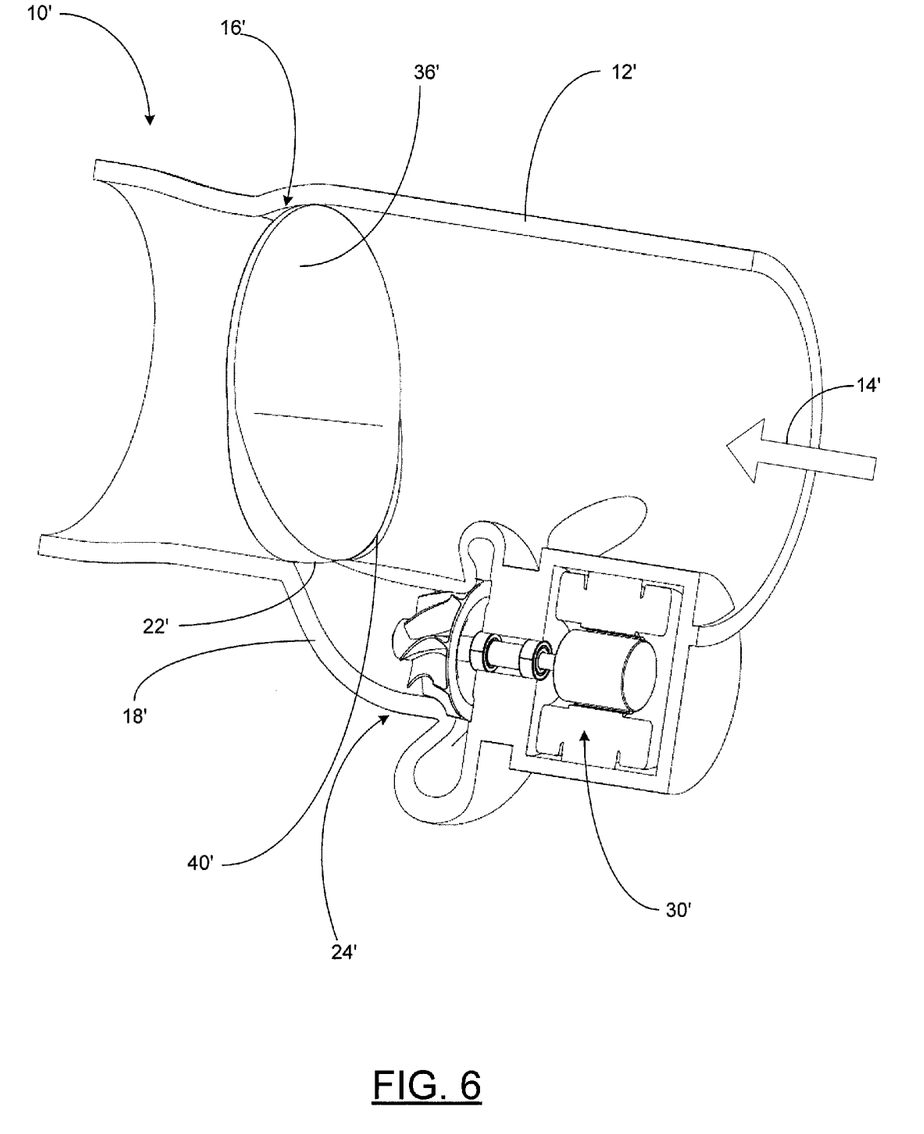
FIG. 6 illustrates a cross-sectional view of a second embodiment of a flow-control assembly in a first position wherein a flow-control valve substantially blocks flow of a fluid through a fluid conduit and a fluid expansion conduit.

However, by way of brief explanation, FIGS. 6-9 illustrate a second embodiment of the flow-control assembly 10' wherein the flow-control valve 16' is configurable between a plurality of positions which block or allow flow of the fluid through the fluid expansion conduit 18' and the fluid conduit 12'. In this regard, FIG. 6 illustrates a cross-sectional view of the flow control assembly 10' when the flow-control valve 16' is in a first position wherein the flow-control valve substantially blocks flow 14' of the fluid through the fluid conduit 12' and the and the fluid expansion conduit 18'. Flow 14' of the fluid through the fluid expansion conduit 18' is prevented by blocking the outlet 22' of the fluid expansion conduit 18'.

Figure 7:
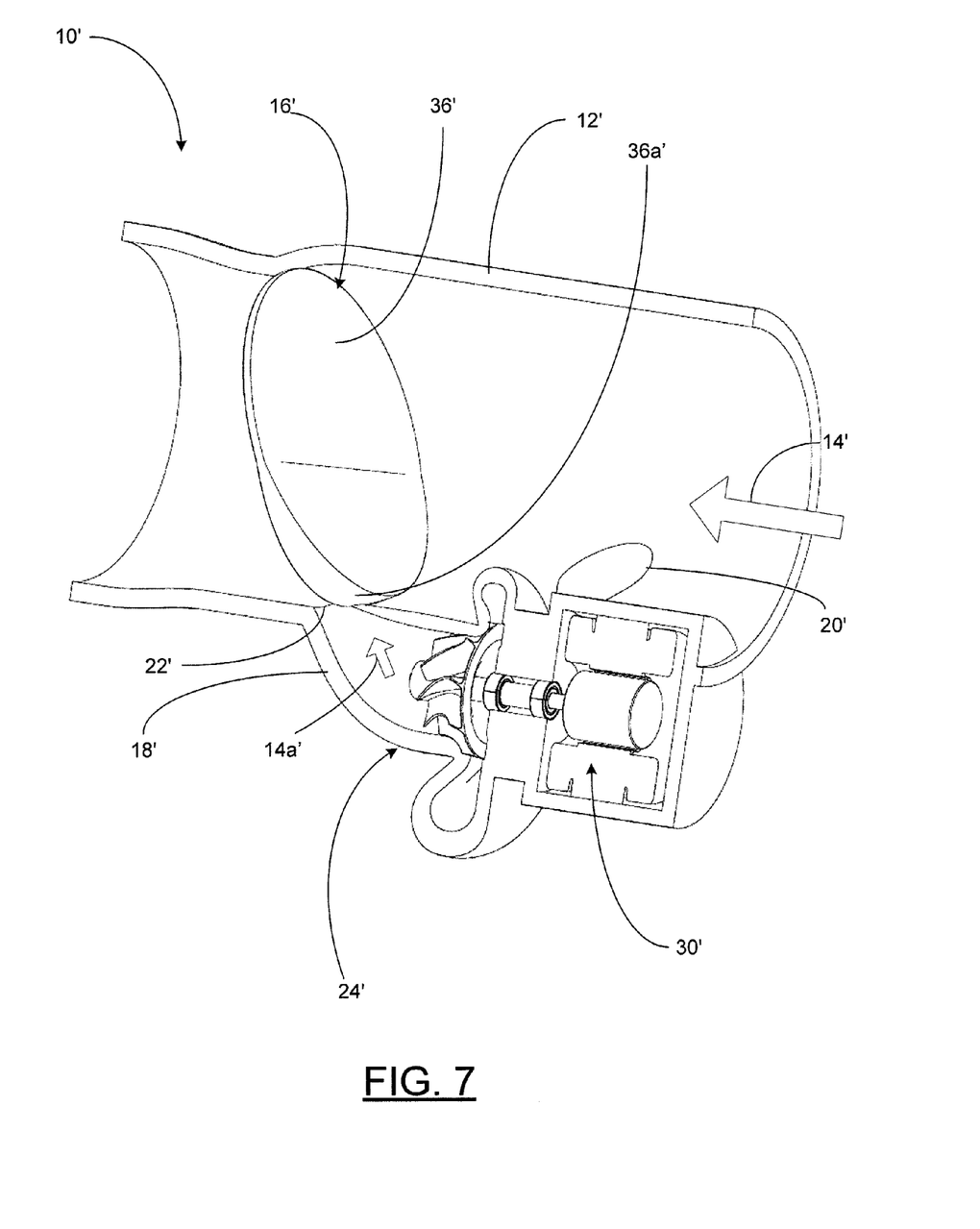
FIG. 7 illustrates a cross-sectional view of the second embodiment of the flow-control assembly of FIG. 6 in a second position wherein a flow-control valve substantially blocks flow of a fluid through the fluid conduit and at least partially unblocks an outlet of the fluid expansion conduit to thereby allow a relatively small flow of the fluid through the fluid expansion conduit.
Figure 8:
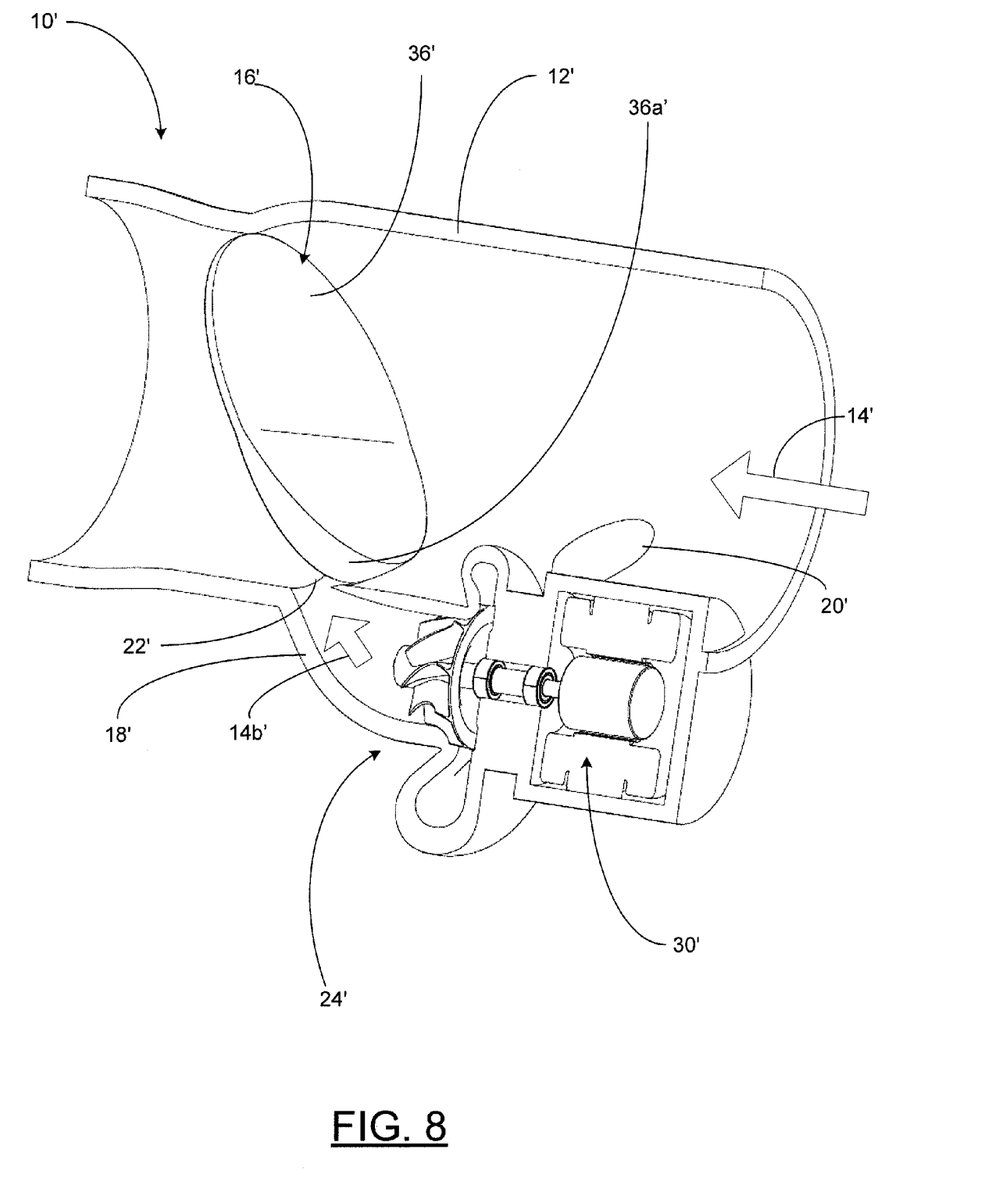
FIG. 8 illustrates a cross-sectional view of the second embodiment of the flow-control assembly of FIG. 6 in the second position wherein the flow-control valve substantially blocks flow of a fluid through the fluid conduit and at least partially unblocks the outlet of the fluid expansion conduit to thereby allow a relatively larger flow of the fluid through the fluid expansion conduit.

FIGS. 7 and 8 illustrates the flow-control assembly 10' when the flow-control valve 16' is configured to a second position wherein the flow-control valve substantially blocks flow 14' of the fluid through the fluid conduit 12' and at least partially unblocks the outlet 22' of the fluid expansion conduit 18' to thereby allow flow 14a', 14b' of the fluid through the fluid expansion conduit, which enters at the inlet 20'. In FIG. 7 the flow-control valve 16' has only slightly transitioned from the first position to the second position by rotating the throttle plate 36' clockwise, and hence a relatively small flow 14a' of the fluid is allowed through the fluid expansion conduit 18'. However, as illustrated, the flow-control assembly 10' substantially blocks flow of the fluid past the flow-control valve 16' through the fluid conduit 12'. In the embodiment illustrated herein, this is accomplished by creating a tight fit between the throttle plate 36' and the fluid conduit 12' in which the flow-control valve 16' is positioned. In particular, in the illustrated embodiment the fluid conduit 12' includes a sealing wall 40' (see FIGS. 6 and 9) which the throttle plate 36' substantially engages when the flow-control valve 16' is in the first position. In order to accommodate rotation of the throttle plate 36', the sealing wall 40' defines a curved profile of substantially the same radius as the throttle plate whereby the throttle plate thus maintains a tight fit with the sealing wall as it rotates to the second position. Further, the throttle plate may include a relatively thicker end 36a' (see FIGS. 7 and 8) in some embodiments which maintains contact with the sealing wall 40' as the throttle plate rotates from the first to the second position.

FIG. 8 illustrates the flow-control valve 16' as it has opened further within the second position. Specifically, FIG. 8 illustrates the flow-control valve 16' with the throttle plate 36' rotated within the second position to a point at which the outlet 22' to the fluid expansion conduit 18' is substantially fully unblocked. Accordingly, flow of the fluid through the flow-control assembly 10' may be adjusted to the desired level by adjusting the flow-control valve 16' within the second position. Thus, for example, the arrangement of the flow-control valve 16' in FIG. 8 may allow for a relatively large flow 14b' of the fluid through the fluid expansion conduit 18' as compared to the relatively small flow 14a' of the fluid allowed by the configuration illustrated in FIG. 7. Further, the second position of the flow-control valve 16', as illustrated in FIGS. 7 and 8 directs substantially all of the flow 14' of the fluid through the fluid expansion conduit 18'. Accordingly, the desired amount of flow of the fluid may be achieved while at the same time using the rotating fluid expander 24' to generate electricity by way of the electrical generator 30' or perform other functions.

Figure 9:
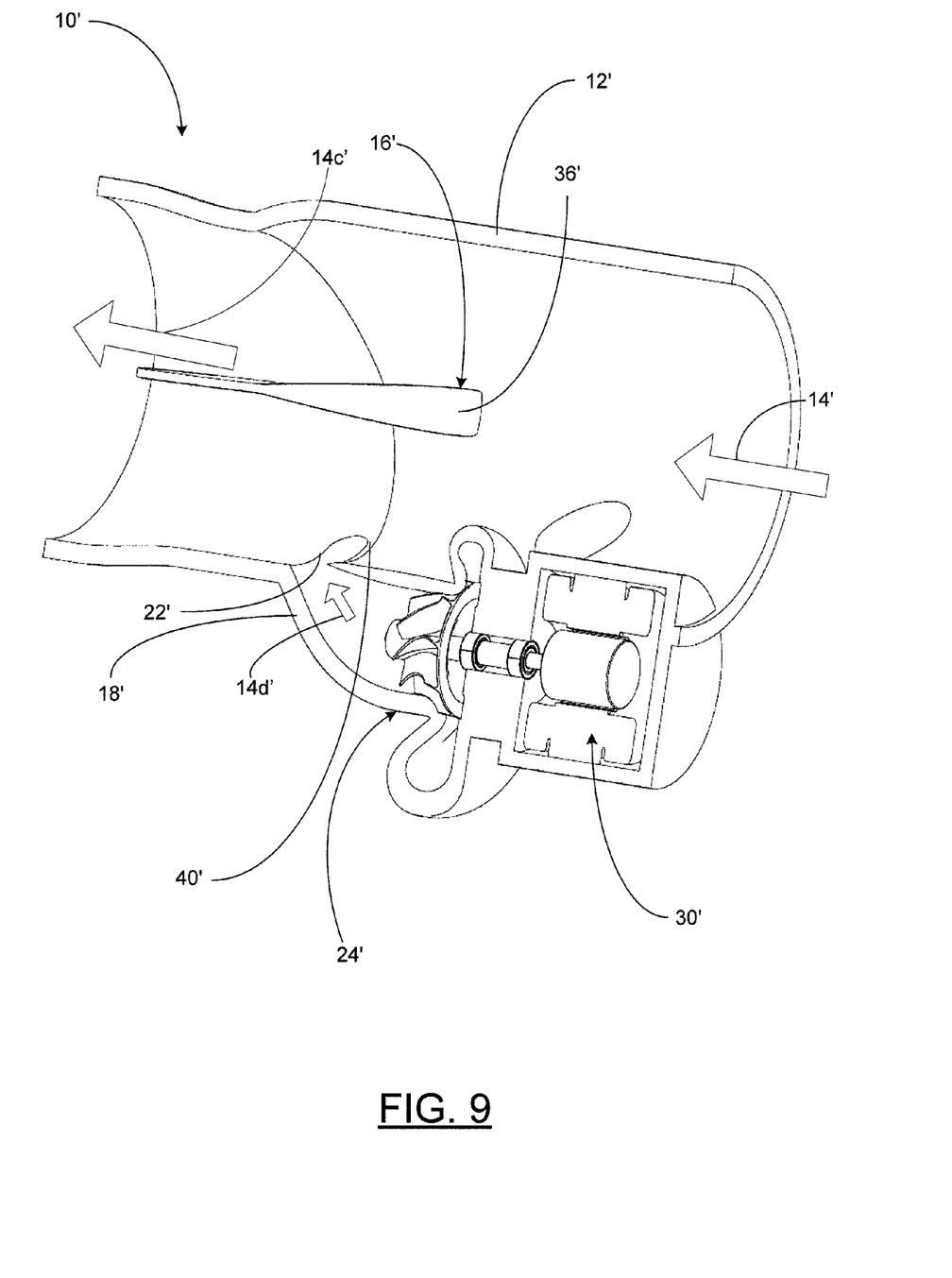
FIG. 9 illustrates a cross-sectional view of the second embodiment of the flow-control assembly of FIG. 6 in a third position wherein the flow-control valve at least partially unblocks the fluid conduit to thereby allow flow of the fluid through the fluid conduit without necessarily passing through the fluid expansion conduit.

However, in some instances additional flow of the fluid through the flow-control assembly 10' may be desirable. Accordingly, as illustrated in FIG. 9, the flow-control valve 16' may be configurable to a third position wherein the flow-control valve at least partially unblocks the fluid conduit 12' to thereby allow flow 14' of the fluid through the fluid conduit without necessarily passing through the fluid expansion conduit 18'. In the third position the throttle plate 36' is rotated, clockwise as illustrated, past the outlet 22' of the fluid expansion conduit 18' and out of contact with the sealing wall 40'. This allows a direct flow 14c' of the fluid to pass through the flow-control valve 16' via the fluid conduit 12' without traveling through the fluid expansion conduit 18'. However, in some embodiments a bypass flow 14d' of the fluid may still travel through the fluid expansion conduit 18' in some instances due to the outlet 22' to the fluid expansion conduit remaining unblocked. Thus, by rotating the throttle plate 36' such that it is substantially parallel with the flow 14' of the fluid, the flow-control valve 16' may allow a maximum flow through the flow-control assembly 10' when the flow-control valve is in the third position.

Thus, operation of the second embodiment of the flow-control assembly 10' is substantially similar to that of the first embodiment of the flow-control assembly 10. Thereby, the second embodiment of the flow-control assembly 10' may be employed in systems such as the system 100 illustrated in FIG. 5 in place of the first embodiment of the flow-control assembly 10. Accordingly, the first embodiment of the flow-control assembly 10 and the second embodiment of the flow-control assembly may be interchangeably used in some embodiments.

Many modifications and other embodiments will come to mind to one skilled in the art to which these embodiments pertain having the benefit of the teachings presented in the foregoing descriptions and the associated drawings. Therefore, it is to be understood that modifications and other embodiments are intended to be included within the scope of the appended claims. Although specific terms are employed herein, they are used in a generic and descriptive sense only and not for purposes of limitation.

That which is claimed:

1. A flow-control assembly comprising:
a fluid conduit configured to receive flow of a fluid;
a flow-control valve in the fluid conduit;
a fluid expansion conduit comprising:
an inlet defined at least in part by the fluid conduit and configured to selectively receive flow of the fluid from the fluid conduit, and
an outlet in fluid communication with the fluid conduit downstream of the flow-control valve; and
a rotating fluid expander in the fluid expansion conduit configured to expand the fluid and thereby rotate;
wherein the flow-control valve is configurable to a first position wherein the flow-control valve substantially blocks flow of the fluid through the fluid conduit and the fluid expansion conduit.

2. The flow-control assembly of claim 1, wherein the rotating fluid expander comprises a turbine.

3. The flow-control assembly of claim 1, wherein the flow-control valve comprises a butterfly valve.

4. The flow-control assembly of claim 1, wherein the rotating fluid expander is coupled to an electrical generator.

5. The flow-control assembly of claim 1, wherein the flow-control valve is configurable to a second position wherein the flow-control valve substantially blocks flow of the fluid through the fluid conduit and at least partially unblocks the fluid expansion conduit to thereby allow flow of the fluid through the fluid expansion conduit.

6. The flow-control assembly of claim 1, wherein the flow-control valve is configurable to a third position wherein the flow-control valve at least partially unblocks the fluid conduit to thereby allow flow of the fluid through the fluid conduit without necessarily passing through the fluid expansion conduit.

7. The flow-control assembly of claim 1, wherein the fluid expansion conduit comprises a volute which substantially surrounds the rotating fluid expander.

8. The flow-control assembly of claim 1, further comprising a valve position sensor configured to detect the position of the flow-control valve.

9. The flow-control assembly of claim 1, wherein the fluid conduit and the fluid expansion conduit are defined by an integral housing.

10. The flow-control assembly of claim 9, wherein the rotating fluid expander is coupled to an electrical generator retained within the integral housing.

11. The flow-control assembly of claim 1, further comprising a valve adjustment mechanism configured to control the flow-control valve.

12. A system for controlling flow of a fluid comprising:
a flow-control assembly comprising:
a fluid conduit configured to receive flow of a fluid;
a flow-control valve in the fluid conduit,
a fluid expansion conduit comprising:
an inlet defined at least in part by the fluid conduit and configured to selectively receive flow of the fluid from the fluid conduit, and
an outlet in fluid communication with the fluid conduit downstream of the flow-control valve; and
a rotating fluid expander in the fluid expansion conduit configured to expand the fluid and thereby rotate;
wherein the flow-control valve is configurable to a first position wherein the flow-control valve substantially blocks flow of the fluid through the fluid conduit and the fluid expansion conduit; and
an internal combustion engine comprising one or more cylinders,
wherein the flow-control assembly is configured to direct flow of the fluid to one or more of the cylinders of the internal combustion engine.

13. The system of claim 12, further comprising an intake manifold configured to receive flow of the fluid from the flow-control assembly and distribute flow of the fluid to two or more of the cylinders.

14. The system of claim 13, wherein the flow-control valve is the only valve for controlling flow of the fluid into the intake manifold.

15. The system of claim 12, further comprising an exhaust manifold configured to receive flow of the fluid from one or more of the cylinders of the internal combustion engine.

16. A method of controlling the flow of a fluid to an internal combustion engine, comprising:
   selectively configuring a flow-control valve between:
      a first position wherein the flow-control valve substantially blocks flow of the fluid through a fluid conduit and a fluid expansion conduct, and
      a second position wherein the flow-control valve substantially blocks flow of the fluid through the fluid conduit and at least partially unblocks the fluid expansion conduit to thereby allow flow of the fluid through the fluid expansion conduit;
   expanding the fluid in the fluid expansion conduit when flow of the fluid is directed thereto to thereby rotate a rotating fluid expander; and
   supplying the expanded fluid to the internal combustion engine.

17. The method of claim 16, further comprising generating electricity by coupling the rotating fluid expander to an electrical generator.

18. The method of claim 16, further comprising directing flow of the fluid through the fluid expansion conduit back into the fluid conduit downstream of the flow-control valve.

19. The method of claim 16, further comprising selectively configuring the flow-control valve to a third position wherein the flow-control valve at least partially unblocks the fluid conduit to thereby allow flow of the fluid through the fluid conduit without necessarily passing through the fluid expansion conduit, and supplying fluid from the fluid conduit to the internal combustion engine.

* * * * *